United States Patent
Wielebski et al.

(10) Patent No.: US 10,146,210 B2
(45) Date of Patent: Dec. 4, 2018

(54) WIRELESS PUSH BUTTON ASSEMBLY FOR INDUSTRIAL AUTOMATION ENVIRONMENTS

(71) Applicant: Rockwell Automation Technologies, Inc., Mayfield Heights, OH (US)

(72) Inventors: Wayne H. Wielebski, New Berlin, WI (US); Michael L. Gasperi, Racine, WI (US); David L. Jensen, Barneveld, WI (US); David D. Brandt, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 355 days.

(21) Appl. No.: 14/959,217

(22) Filed: Dec. 4, 2015

(65) Prior Publication Data
US 2016/0085236 A1   Mar. 24, 2016

Related U.S. Application Data (63) Continuation of application No. 12/391,074, filed on Feb. 23, 2009, now Pat. No. 9,207,664.

(60) Provisional application No. 61/106,492, filed on Oct. 17, 2008.

(51) Int. Cl.
| | |
|---|---|
| G05B 19/414 | (2006.01) |
| H04W 4/80 | (2018.01) |
| G05B 19/409 | (2006.01) |
| H04B 5/00 | (2006.01) |

(52) U.S. Cl.
CPC ......... *G05B 19/414* (2013.01); *G05B 19/409* (2013.01); *H04B 5/0037* (2013.01); *H04W 4/80* (2018.02); *G05B 2219/31449* (2013.01); *G05B 2219/33192* (2013.01)

(58) Field of Classification Search
None
See application file for complete search history.

(56) References Cited

U.S. PATENT DOCUMENTS

| | | |
|---|---|---|
| 3,718,828 A | 2/1973 | Britton et al. |
| 5,253,564 A | 10/1993 | Rosenbrock et al. |
| 6,885,289 B1 | 4/2005 | Nakai |
| 7,006,845 B2 | 2/2006 | Simon et al. |

(Continued)

OTHER PUBLICATIONS

Michael Catrysse, et al., "An Inductive Power System with Integrated Bi-directional Data-transmission," Sensors and Actuators, 2004, pp. 221-229, Elsevier, www.sciencedirect.com.

(Continued)

*Primary Examiner* — Charles Garber
*Assistant Examiner* — Alia Sabur (57) ABSTRACT

What is disclosed is a system for controlling a process, where the process is implemented by a machine system. The system includes a user interface device and a first transceiver coupled to the user interface device. The first transceiver is configured to receive communications from the user interface device and transfer the communications. The system also includes a second transceiver in communication with the first transceiver and configured to transfer power to the first transceiver, receive the communications from the first transceiver, and transfer the communications to control the process implemented by the machine system.

15 Claims, 6 Drawing Sheets

(56) References Cited

U.S. PATENT DOCUMENTS

| | | | |
|---|---|---|---|
| 7,251,570 | B2 | 7/2007 | Hancock et al. |
| 7,315,236 | B2 | 1/2008 | Yanagida et al. |
| 7,355,506 | B2 | 4/2008 | Chandley |
| 7,518,489 | B2 | 4/2009 | Nelson et al. |
| 7,550,869 | B2 | 6/2009 | Higuchi et al. |
| 7,912,597 | B2 | 3/2011 | Yamada |
| 7,961,092 | B2 | 6/2011 | Freathy et al. |
| 7,978,076 | B2 | 7/2011 | Fast et al. |
| 7,983,426 | B2 | 7/2011 | Schuler et al. |
| 8,138,898 | B2 | 3/2012 | Jatschka et al. |
| 8,203,445 | B2 | 6/2012 | Recker et al. |
| 8,244,234 | B2 | 8/2012 | Zhu et al. |
| 8,400,017 | B2 | 3/2013 | Kurs et al. |
| 8,569,914 | B2 | 10/2013 | Karalis et al. |
| 8,571,486 | B2 | 10/2013 | Gasperi et al. |
| 2006/0144682 | A1* | 7/2006 | Karweik ............ H01H 9/0066 200/329 |
| 2006/0265231 | A1 | 11/2006 | Fusaro et al. |
| 2007/0013545 | A1 | 1/2007 | Tippelt |
| 2007/0080783 | A1 | 4/2007 | Ghosh et al. |
| 2007/0158441 | A1 | 7/2007 | Briole et al. |
| 2007/0200778 | A1 | 8/2007 | Henty |
| 2007/0205860 | A1* | 9/2007 | Jones ................ G05B 19/4183 340/5.61 |
| 2008/0007408 | A1 | 1/2008 | Hwang et al. |
| 2008/0100456 | A1* | 5/2008 | Downie .............. G02B 6/3825 340/572.8 |
| 2008/0186178 | A1 | 8/2008 | Tuttle et al. |
| 2009/0167496 | A1 | 7/2009 | Norman |
| 2009/0227205 | A1* | 9/2009 | Rofougaran ......... H04B 5/0025 455/41.1 |
| 2010/0057296 | A1 | 3/2010 | Ryman |
| 2010/0079289 | A1 | 4/2010 | Brandt et al. |
| 2010/0097186 | A1 | 4/2010 | Wielebski et al. |
| 2010/0304683 | A1 | 12/2010 | Gasperi |

OTHER PUBLICATIONS

Franklin Hadley, "Goodbye Wires . . . MIT Team Experimentally Demonstrates Wireless Power Transfer, Potentially Useful for Powering Laptops, Cell Phones, Without Cords," MIT News, Jun. 7, 2007, 3 pages, MIT News Office, Cambridge, Massachusetts.

John Markoff, "Intel Moves to Free Gadgets of Their Recharging Cords," The New York Times, Aug. 20, 2008, 5 pages, The New York Times, New York, New York.

Tsuyoshi Sekitani, et al., "A Large-area Wireless Power-transmission Sheet Using Printed Organic Transistors and Plastic MEMS Switches," Nature Materials, Jun. 2007, pp. 413-417, vol. 6, Nature Publishing Group.

Makoto Takamiya, et al., "Design Solutions for a Multi-object Wireless Power Transmission Sheet Based on Plastic Switches," IEEE International Solid-state Circuits Conference, Feb. 13, 2007, pp. 362-363 and 609, Session 20, IEEE.

Glenn Vandevoorde, et al., "Wireless Energy Transfer for Stand-alone Systems: A Comparison Between Low and High Power Applicability," Sensors and Actuators, 2001, pp. 305-311, Elsevier.

\* cited by examiner

WIRELESS PUSH BUTTON ASSEMBLY FOR INDUSTRIAL AUTOMATION ENVIRONMENTS

RELATED APPLICATIONS

This application is a continuation of, claims priority to, and incorporates by reference U.S. patent application Ser. No. 12/391,074, filed on Feb. 23, 2009, entitled "USER INTERFACE DEVICES FOR CONTROL OF MACHINE SYSTEMS," which will issue on Dec. 8, 2015, as U.S. Pat. No. 9,207,664, and which claims priority to U.S. Provisional Patent Application 61/106,492, filed on Oct. 17, 2008.

TECHNICAL FIELD

Aspects of the disclosure are related to the field of industrial and automation controls, and in particular, to user interface devices for control of operations of machine systems.

TECHNICAL BACKGROUND

Industrial and automation control panels typically include electrical switches, pushbuttons, indicator lamps, selector switches, or other user interface devices, disposed on metal plates or enclosure doors. The user interface devices can be human-interface devices for an operator to control and monitor the operations and processes of machine systems.

In typical installations, these user interface devices are inserted through holes in the control panels and secured with threaded rings. The user interface devices are then connected via discrete wires and screw terminals to the associated machine systems, with many user interface devices typically arrayed on a control panel. However, using discrete wires and screw terminals presents challenges in the assembly, testing, installation, and maintenance of these control panels. Opportunities for mis-wiring, improper placement of user interface devices within the control panel assembly, failure of wires in high-vibration environments, among other problems, present substantial issues in the use of industrial and automation control panels for controlling the operations and processes of machine systems.

Overview

What is disclosed is a system for controlling a process, where the process is implemented by a machine system. The system includes a user interface device and a first transceiver coupled to the user interface device. The first transceiver is configured to receive communications from the user interface device and transfer the communications. The system also includes a second transceiver in communication with the first transceiver and configured to transfer power to the first transceiver, receive the communications from the first transceiver, and transfer the communications to control the process implemented by the machine system.

What is also disclosed is a method for controlling a process, wherein the process is implemented by a machine system. The method includes, in a first transceiver coupled to a user interface device, receiving communications from the user interface and transferring the communications. The method also includes, in a second transceiver, transferring power to the first transceiver, receiving the communications from the first transceiver, and transferring the communications to control the process implemented by the machine system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
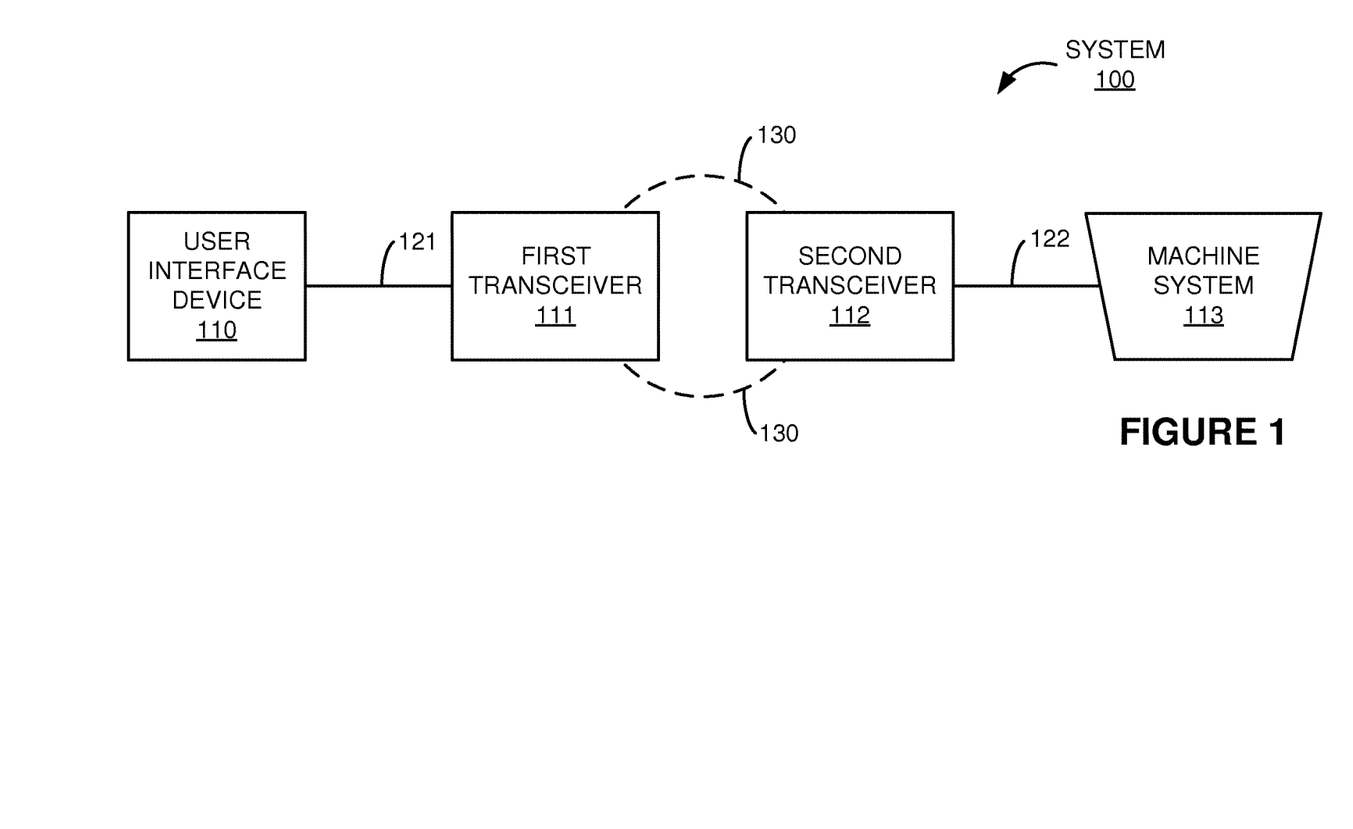
FIG. 1 is a system diagram illustrating a system for controlling a process implemented by a machine system.

FIG. 1 is a system diagram illustrating system 100 for controlling a process, where the process is implemented by a machine system. System 100 includes user interface device 110, first transceiver 111, second transceiver 112, and machine system 113. User interface device 110 and first transceiver 111 are coupled by link 121. First transceiver 111 and second transceiver 112 are coupled by wireless link 130. Second transceiver and machine system 113 communicate over link 122.

User interface device 110 includes equipment and circuitry for receiving user input and control. Examples of user interface device 110 include push buttons, selection knobs, dials, switches, actuators, keys, keyboards, pointer devices, microphones, transducers, potentiometers, non-contact sensing circuitry, or other human-interface equipment. In some examples, user interface device 110 also includes equipment to communicate information to an operator of user interface device 110. Examples of the equipment to communicate information to the operator could include indicator lights, lamps, light-emitting diodes, displays, haptic feedback devices, audible signal transducers, speakers, buzzers, alarms, or other indicator equipment, including combinations thereof.

First transceiver 111 includes circuitry to induce an electromagnetic field in the air, space, or material environment of first transceiver 111. First transceiver 111 also includes circuitry to detect and receive electromagnetic fields from the air, space, or material environment of first transceiver 111. Examples of first transceiver 111 include transformers, transformer windings, electrically conductive coils, amplifiers, power coupling circuitry, communication equipment, printed circuit boards, or other circuitry and materials, including combinations thereof. In some examples, first transceiver 111 is tuned to be sensitive to near-field electromagnetic fields.

Second transceiver 112 includes circuitry to induce an electromagnetic field in the air, space, or material environment of second transceiver 112. Second transceiver 112 also includes circuitry to detect and receive electromagnetic fields from the air, space, or material environment of second transceiver 112. Examples of second transceiver 112 include transformers, transformer windings, electrically conductive coils, amplifiers, power coupling circuitry, communication equipment, printed circuit boards, or other circuitry and materials, including combinations thereof. Second transceiver 112 could be of a similar configuration as first transceiver 111, or could be of a different configuration, size, or shape. In some examples, second transceiver 112 is tuned to be sensitive to near-field electromagnetic fields.

First transceiver 111 and second transceiver 112 do not share a transformer core in many examples of system 100. A transformer core is typically a magnetically permeable material used to channel, confine, or contain magnetic fields to the transformer core. However, in the example shown in system 100, a transformer core is not employed.

Also, in further examples, second transceiver 112 could include a primary coil or winding of a transformer, whereas first transceiver 111 could include a secondary coil or winding of the transformer. In many examples where second transceiver 112 and first transceiver 111 include primary and secondary coils or windings of a transformer, the coils or windings contained therein are not coupled by a transformer core, and removably separate from each other. It should be understood that the notation of primary and secondary could be interchanged.

Machine system 113 includes an operation or process implemented by a machine system. Examples of machine system 113 include various functions of machinery, manufacturing equipment, assembly equipment, milling equipment, presses, hydraulic equipment, vehicles, or other machine systems, including combinations thereof. Further examples of a process include a lathe machine speed control, a roller mechanism engagement button, an on/off function of a manufacturing device, a lift function for a forklift, among other examples.

Wireless link 130 uses various communication media, such as air, space, or some other wireless transport media—including combinations thereof. Wireless link 130 could include an electromagnetic link between first transceiver 111 and second transceiver 112. In some examples, wireless link 130 includes an electromagnetic field induced by first transceiver 111 in the surroundings of first transceiver 111. Second transceiver 112 could detect and receive the electromagnetic field energy induced by first transceiver 111. In other examples, wireless link 130 includes an electromagnetic field induced by second transceiver 112 in the surroundings of second transceiver 112. First transceiver 111 could detect and receive the electromagnetic field energy induced by second transceiver 112. In many examples, first transceiver 111 and second transceiver 112 are located in close proximity to each other to advantageously receive a larger portion of the electromagnetic energy induced to form wireless link 130. In some examples, wireless link 130 is a near-field electromagnetic link.

In examples of a near-field electromagnetic link, the link utilizes localized electromagnetic field energy coupled to other elements in a system by a resonance mechanism. The electromagnetic field energy produced by one device can couple using the near field to induce a current in another device located within a close distance. The near field is in contrast to examples of a far-field link in which the link distance is greater and relies upon electromagnetic energy radiated into space, typically through the use of an antenna, to establish a link. A near-field electromagnetic link, in typical examples, has a link distance smaller than the wavelength of the electromagnetic energy transferred across the electromagnetic link, and is in contrast to examples of a far-field electromagnetic link in which the link distance is greater than the wavelength of the electromagnetic energy transferred.

Wireless link 130 may comprise many different signals sharing the same link. Wireless link 130 could include multiple signals operating in a single "path"—as represented by the dashed lines in FIG. 1—comprising multiple frequencies, channels, directional links, logical transportation links, or communication directions. For example, communications and control signals between first transceiver 111 and second transceiver 112 could share the same wireless link 130, but be transferred over different frequencies, channels, directional links, logical transportation links, or communication directions—including combinations thereof. Additionally, wireless link 130 may comprise a direct or modulated transfer of energy from either of first transceiver 111 and second transceiver 112 to one another. In some examples, this transfer of energy could occur concurrently with other communication signaling across link wireless 130.

Links 121 and 122 use various communication media, such as air, space, metal, optical fiber, or some other signal propagation path—including combinations thereof. Links 121 and 122 could be wired or wireless and could use communication interfaces such as DeviceLogix, radio-frequency identification (RFID), controller-area network (CAN), wireless fidelity (WiFi), infrared data association (IrDA), or other communication interfaces—including combinations, improvements, or variations thereof. Links 121 and 122 could be direct links or might include various equipment, intermediate components, systems, and networks. In some examples, links 121 and 122 include multiple signals operating in a single pathway in a similar manner as link 130.

Figure 2:
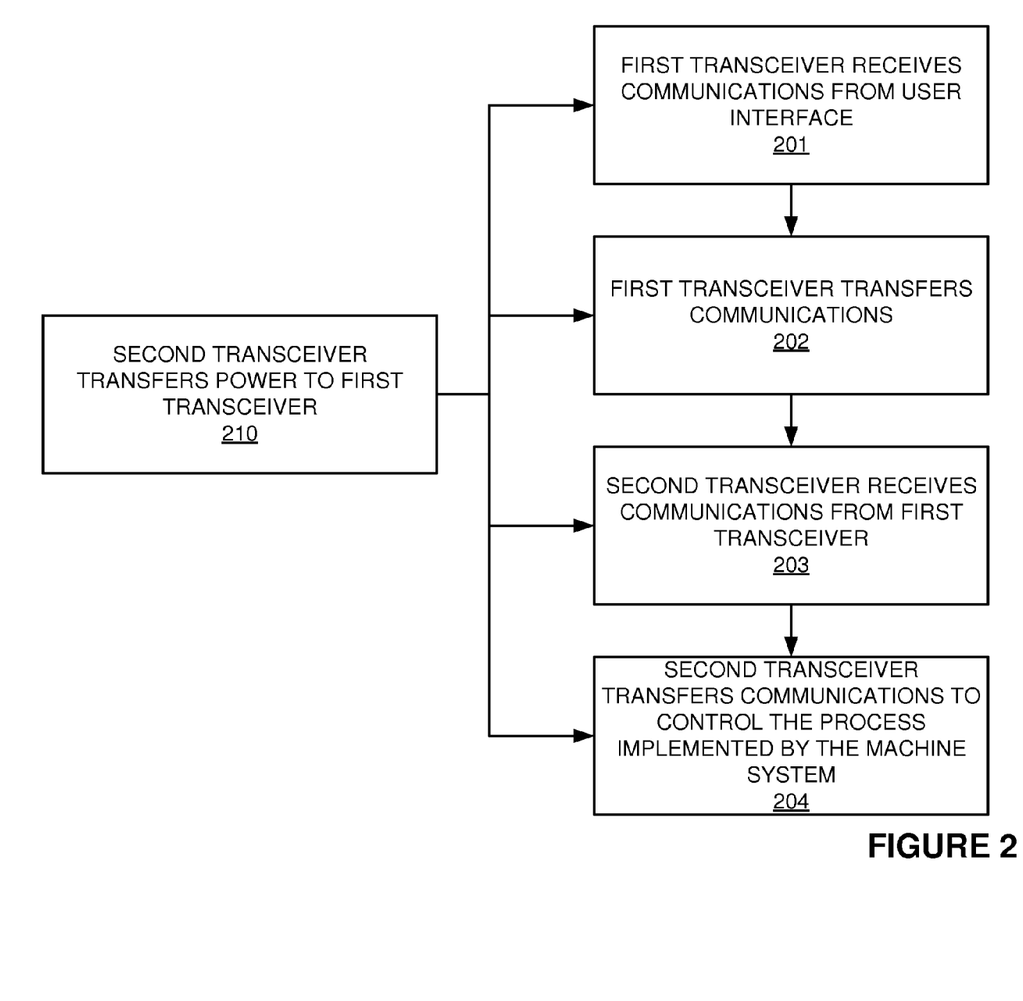
FIG. 2 is a flow diagram illustrating a method of operation of a system for controlling a process implemented by a machine system.

FIG. 2 is a flow diagram illustrating a method of operation of system 100 for controlling a process that is implemented by a machine system, as found in FIG. 1. The operations shown in FIG. 2 are indicated herein parenthetically.

In FIG. 2, second transceiver 112 transfers (210) power to first transceiver 111 over wireless link 130. In many examples, second transceiver 112 creates a near-field electromagnetic field in the space and materials surrounding second transceiver 112. This near-field electromagnetic field induces a current in first transceiver 111, and can be used to transfer power from second transceiver 112 to first transceiver 111 over wireless link 130.

First transceiver 111 receives (201) communications from user interface device 110. The communications could result from a user interacting with user interface device 110. For example, if user interface device 110 includes a push button, the communications could reflect the state of the push button, among other information. In other examples, user interface includes a rotary control, and the communications could include information related to the position of the rotary control.

First transceiver 111 transfers (202) the communications over wireless link 130. In many examples, first transceiver 111 creates a near-field electromagnetic field in the space and materials surrounding first transceiver 111. The near-field electromagnetic field could be modulated to transfer the communications received from user interface device 110, or other forms of information transfer or wireless protocols could be employed.

Second transceiver 112 receives (203) the communications from first transceiver over wireless link 130. In some examples, a near-field electromagnetic field produced by first transceiver 111 induces a corresponding current in second transceiver 112, and can be used to transfer communications from first transceiver 111 to second transceiver 112 over wireless link 130.

Second transceiver 112 then transfers (204) the communications to control a process implemented by a machine system, such as machine system 113. Machine system 113 could then implement the communications to enact a physical action in some form of machinery, engage a mechanism, move an actuator, or other response, including both physical and logical actions.

It should be understood that the communications transferred over wireless link 130 could be of a different form than that transferred from user interface device 110 or to machine system 113. For example, a first communication protocol could be used to transfer communications from user interface device 110, a second communication protocol employed over wireless link 130, and a third communication protocol employed over link 122.

Furthermore, it should be understood that although the term 'process' is used herein to describe what is implemented in or controlled by a machine system, it should be understood that the term 'process' could also refer to an operation, phase, or other action implemented in or controlled by a machine system.

Figure 3:
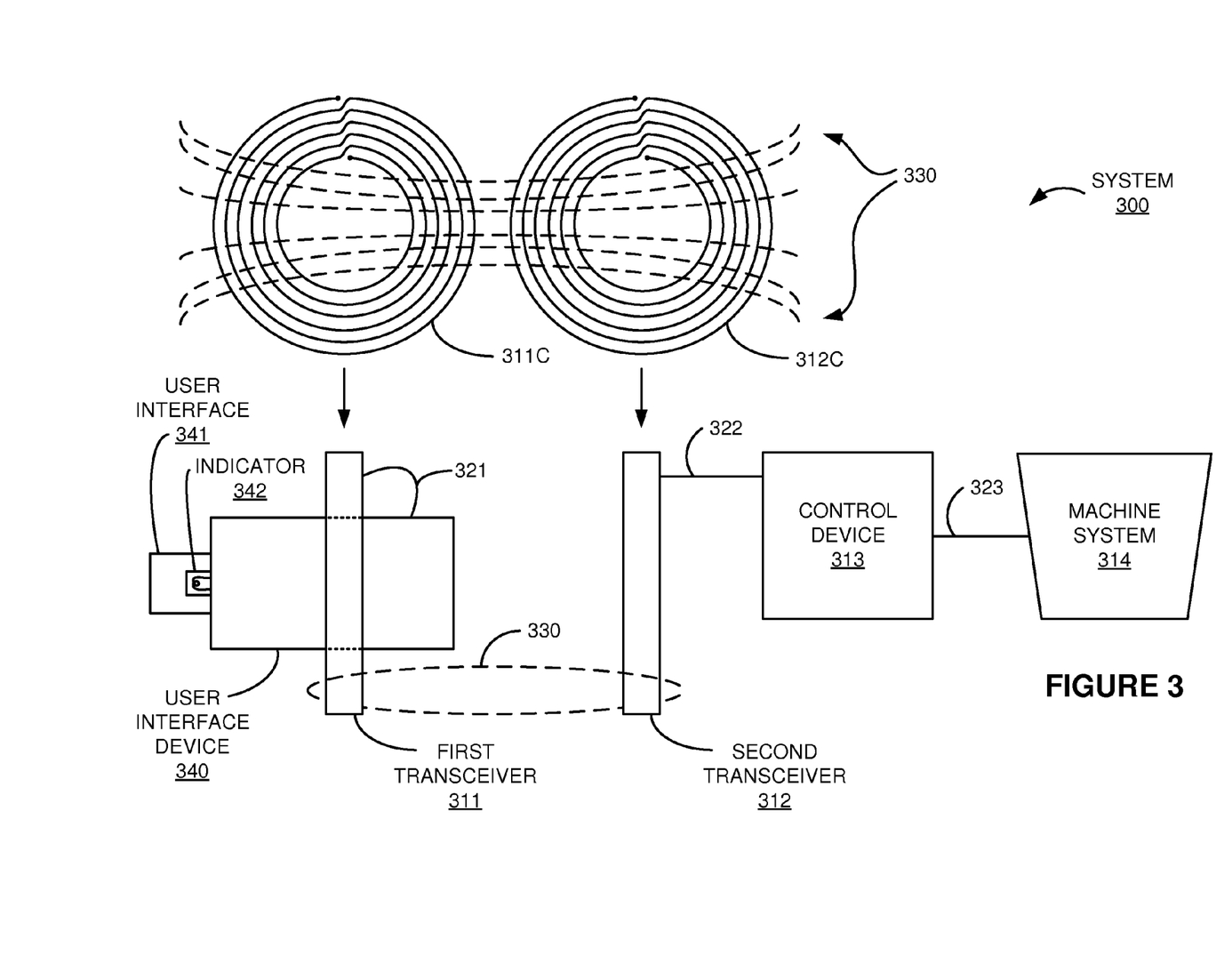
FIG. 3 is a system diagram illustrating a system for controlling a process implemented by a machine system.

FIG. 3 is a system diagram illustrating system 300 for controlling a process, where the process is implemented by a machine system. System 300 includes user interface device 340, first transceiver 311, second transceiver 312, control device 313, and machine system 314. User interface device 340 includes user interface 341 and indicator 342.

User interface device 340 and first transceiver 311 communicate over link 321. First transceiver 311 and second transceiver 312 communicate over wireless link 330. Second transceiver 312 and control device 313 communicate over link 322. Control device 313 and machine system 314 communicate over link 323.

User interface device 340 includes equipment, circuitry, or mechanisms for receiving user input and control, as well as equipment, circuitry, or mechanisms for indicating a state of the process implemented in a machine system to a user. User interface device 340 includes user interface 341, which in this example includes a lighted pushbutton, although in other examples, user interface device 340 could include other equipment. User interface 341 also includes indicator 342. In this example, indicator 342 includes a visible light, such as an incandescent lamp or a light-emitting diode. In some examples, indicator 342 is mounted internally to a push button of user interface 341, with the push button of user interface 341 being made of a material sufficiently translucent to pass light from indicator 342.

First transceiver 311 includes circuitry to induce a magnetic field in the air, space, or material environment of first transceiver 311. First transceiver 311 also includes circuitry to detect and receive magnetic fields from the air, space, or material environment of first transceiver 311. In this example, first transceiver 311 includes an electrically conductive coil, as illustrated by the front-view of the circular shapes of coil 311C in FIG. 3. Also in this example, first transceiver 311 is tuned to be sensitive to near-field magnetic fields. In some examples, coil 311C could be formed as a printed circuit on a printed circuit board (PCB) assembly, and could further include several electrically connected coils on different layers of a PCB. In other examples, coil 311C could include wire wrapped around a central spindle.

Second transceiver 312 includes circuitry to induce a magnetic field in the air, space, or material environment of second transceiver 312. Second transceiver 312 also includes circuitry to detect and receive magnetic fields from the air, space, or material environment of second transceiver 312. In this example, second transceiver 312 includes an electrically conductive coil, as illustrated by the front-view of the circular shapes of coil 312C in FIG. 3. Also in this example, second transceiver 312 is tuned to be sensitive to near-field magnetic fields. In some examples, coil 312C could be formed as a printed circuit on a printed circuit board (PCB) assembly, and could further include several electrically connected coils on different layers of a PCB. In other examples, coil 312C could include wire wrapped around a central spindle.

Although spiral-shaped coils, as shown via front-view in FIG. 3, are included in this example of first transceiver 311 and second transceiver 312, it should be understood that the coils could be of other configurations, a different geometry, or a different number of turns, as determined by the communications, power transfer, or efficiency desires of system 300, or by other factors, including combinations thereof. For example, the coils could be formed by a series of open concentric shapes, where the ends of the open concentric shapes are electrically connected in a series fashion. In this example, it should be noted that although the coils of first transceiver 311 are shown as a similar size, shape, and number of turns as that of second transceiver 312, in other examples second transceiver 312 could also be of a different configuration.

In further examples of first transceiver 311 and second transceiver 312 other equipment and circuitry could be included. For instance, circuitry such as capacitors, inductors, resistors, or active components could be employed to establish a frequency resonance, sensitivity, or proper operation of first transceiver 311 and second transceiver 312 based on the coil shapes, number of turns, or other factors. Additionally, in typical examples, first transceiver 311 and second transceiver 312 include circuitry to facilitate communications and power transfer across link 330.

Also, in further examples, coil 312C of second transceiver 312 could be a primary coil or winding of a transformer, where coil 311C of first transceiver 311 could be a secondary coil or winding of the transformer. In many examples where coil 312C and coil 311C are primary and secondary coils or windings of a transformer, coil 312C and coil 311C are not coupled by a transformer core, and removably separate from each other. It should be understood that the notation of primary and secondary could be interchanged.

As shown in the example in FIG. 3, user interface device 340 is disposed inside first transceiver 311 by being mounted internally to and longitudinally along the axis of first transceiver 311. User interface device 340 passes through the middle portion of coil 311C of first transceiver 311, so that first transceiver 311 could be mounted to surround user interface device 340. Also, coil 311C of first transceiver 311 and coil 312C of second transceiver 312 are not formed on the same assembly in this example.

Advantageously, mounting user interface device 340 internally to first transceiver 311 could allow for compact mounting of an assembly incorporating both user interface device 340 and first transceiver 311 to a control panel, cabinet, or other mounting structure. In some examples, first transceiver 311 takes the place of a gasket or a seal normally used when mounting user interface device 340 to a control panel. Additionally, an assembly which includes both user interface device 340 and first transceiver 311 could be removably mounted to another assembly, such as a control panel, incorporating second transceiver 312 to allow for close proximity of first transceiver 311 and second transceiver 312. In many examples, an assembly incorporating both user interface device 340 and first transceiver 311 could be further disposed inside second transceiver 312, being mounted internally to and longitudinally along the axis of second transceiver 312, with first transceiver 311 and second transceiver 312 coming into close proximity.

In examples where first transceiver 311 and second transceiver 312 are each formed on separate, generally flat, PCB assemblies, both transceivers could be mounted with the generally flat surfaces of each PCB assembly in close proximity, and user interface device 340 mounted internally to, and longitudinally along, the axis of the combined first transceiver 311 and second transceiver 312, thereby being disposed inside first transceiver 311 and second transceiver 312. Advantageously, if user interface device 340 and first transceiver 311 are mounted together as an assembly, quick insertion and removal of the assembly of user interface device 340 and first transceiver 311 from second transceiver 312 could be achieved without the need to connect or disconnect a wired interface. During assembly and maintenance, in this example of user interface device 340 and first transceiver 311 mounted as an assembly into a control panel which incorporates second transceiver 312, the removal or insertion of the user interface device 340 and first transceiver 311 assembly can be greatly eased without the need to connect or disconnect a wired interface.

Control device 313 includes equipment and circuitry to transfer power to second transceiver 312 over link 322, as well as exchange communication with second transceiver 312 over link 322. Examples of control device 313 include amplifiers, filters, switches, solid-state electronics, microprocessors, antennas, or other circuitry. In further examples, control device 313 transfers control information to machine system 314 over link 323, and could receive information related to the state of the process implemented by the machine system in machine system 314 over link 323. Control device 313 could communicate with further systems and equipment over communication interfaces such as DeviceLogix, radio-frequency identification (RFID), controller-area network (CAN), wireless fidelity (WiFi), infrared data association (IrDA), or other communication interfaces—including combinations, improvements, or variations thereof.

Machine system 314 includes a process implemented by a machine system. Examples of machine system 314 include various functions of machinery, manufacturing equipment, assembly equipment, milling equipment, presses, hydraulic equipment, vehicles, or other machine systems, including combinations thereof.

Wireless link 330 is shown in FIG. 3 as being comprised of magnetic field lines, as illustrated by the dashed lines passing through the coils of first transceiver 311 and second transceiver 312. Wireless link 330 uses various communication media, such as air, space, material, or some other wireless transport media—including combinations thereof. Wireless link 330 could include a magnetic link, electromagnetic link, electrostatic link, or other link, between first transceiver 311 and second transceiver 312. In this example, wireless link 330 includes a magnetic field induced by coil 311C of first transceiver 311 in the surroundings of first transceiver 311. Second transceiver 312 could detect and receive the magnetic field energy induced by first transceiver 311. In other examples, wireless link 330 includes a magnetic field induced by coil 312C of second transceiver 312 in the surroundings of second transceiver 312. First transceiver 311 could detect and receive the magnetic field energy induced by second transceiver 312.

In many examples, first transceiver 311 and second transceiver 312 are located in close proximity to each other to advantageously receive a larger portion of the magnetic energy induced to form wireless link 330. In this example, wireless link 330 is a near-field magnetic link. It should be understood that the magnetic field lines illustrated by the dashed lines in wireless link 330 of FIG. 3 are merely representative of wireless link 330 to show magnetic fields generated by one coil are able to be received at another coil.

In examples of a near-field magnetic link, the link uses localized magnetic field energy coupled to other elements in a system by a resonance mechanism. The magnetic field energy produced by one device can couple using the near field to induce a current in another device located within a close distance. Advantageously, when first transceiver 311 and second transceiver 312 are located within close proximity, and with coils 311C and 312C generally aligned, the near-field magnetic link could transfer a higher level of power or energy between first transceiver 311 and second transceiver 312. This is in contrast to a far-field electromagnetic link which has difficulty with power transfer, as energy transfer efficiency and coupling reduces sharply as the separation distance increases.

Wireless link 330 may comprise many different signals sharing the same link. Wireless link 330 could include multiple signals operating in a single "path"—as represented by the dashed lines in FIG. 3—comprising multiple frequencies, channels, directional links, logical transportation links, or communication directions. For example, communications and control signals between first transceiver 311 and second transceiver 312 could share the same wireless link 330, but be transferred over different frequencies, channels, directional links, logical transportation links, or communication directions—including combinations thereof. Additionally, wireless link 330 may comprise a direct or modulated transfer of energy from either of first transceiver 311 and second transceiver 312 to one another. In some examples, this transfer of energy occurs concurrently with other communication signaling across link wireless 330.

Links 321-323 use various communication media, such as air, space, metal, optical fiber, or some other signal propagation path—including combinations thereof. Links 321-323 could be wired or wireless and could use communication interfaces such as DeviceLogix, radio-frequency identification (RFID), controller-area network (CAN), wireless fidelity (WiFi), infrared data association (IrDA), or other communication interfaces—including combinations, improvements, or variations thereof. Links 321-323 could be direct links or might include various equipment, intermediate components, systems, and networks. In some examples, links 321-323 include multiple signals operating in a single pathway in a similar manner as link 330.

Figure 4:
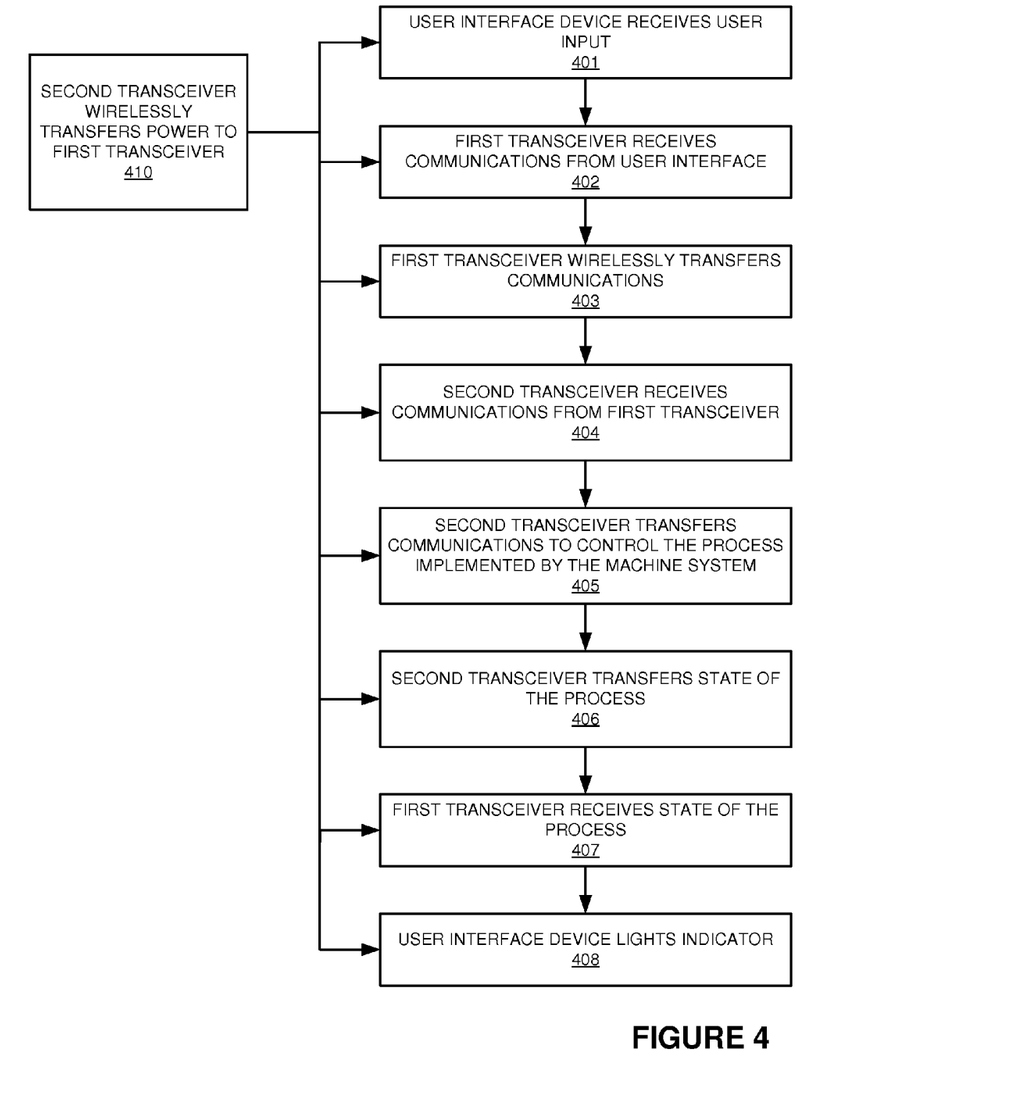
FIG. 4 is a flow diagram illustrating a method of operation of a system for controlling a process implemented by a machine system.

FIG. 4 is a flow diagram illustrating a method of operation of system 300 for controlling a process that is implemented by a machine system, as found in FIG. 3. The operations shown in FIG. 4 are indicated herein parenthetically.

In FIG. 4, second transceiver 312 wirelessly transfers (410) power to first transceiver 311 over wireless link 330. In this example, second transceiver 312 creates a near-field magnetic field in the space and materials surrounding second transceiver 312. This near-field magnetic field induces a current in first transceiver 311, and can be used to transfer power from second transceiver 312 to first transceiver 311 over wireless link 330. Also in this example, the amount of power transferred is sufficient to power not only the circuitry in first transceiver 311 and user interface device 340, but also indicator 342.

User interface device 340 receives (401) user input from user interface 341. The user input, in typical examples, results from a user interacting with user interface 341. In this example, user interface device 340 includes a push button user interface 341, thus the user input could be a physical push or release of the push button.

First transceiver 311 receives (402) communications from user interface device 340. The communications could result from a user interacting with user interface 341. In this example, user interface device 340 includes a push button user interface 341, thus the communications could reflect the state of the push button, among other information.

First transceiver 311 transfers (403) the communications over wireless link 330. In this example, first transceiver 311 creates a near-field magnetic field in the space and materials surrounding first transceiver 311. The near-field magnetic field could be modulated to transfer the communications received from user interface device 340, or other forms of information transfer or wireless protocols could be employed.

Second transceiver 312 receives (404) the communications from first transceiver over wireless link 330. In this example, a near-field magnetic field produced by first transceiver 311 induces a corresponding current in second transceiver 312, and can be used to transfer communications from first transceiver 311 to second transceiver 312 over wireless link 330.

Second transceiver 312 then transfers (405) the communications to control a process implemented by a machine system, such as machine system 314. In this example, the communications transferred from second transceiver 312 are received by control device 313 over link 322. Control device 313 could further interpret or modify the communications format or protocol to enable further transfer of the communications to machine system 314. In some examples, control device 313 includes circuitry and equipment to interpret the communications received from second transceiver 312 to drive a relay circuit or switching circuit which could control machine system 314 over link 323. In other examples, the communications received from second transceiver 312 could be amplified, isolated, or passed through protection circuitry in control device 313 to facilitate control of high-current or hazardous environment equipment in machine system 314.

Machine system 314 could then implement the communications to enact a physical action in some form of machinery, engage a mechanism, move an actuator, or other response, including both physical and logical actions.

It should be understood that the communications transferred over wireless link 330 could be of a different form than that transferred from user interface device 340 or to machine system 314. For example, a first communication protocol could be used to transfer communications from user interface device 410 over link 321, a second communication protocol employed over wireless link 330, and other communication protocols employed over links 322-323.

Second transceiver 312 transfers (406) information relating to the state of a process implemented in machine system 314 over wireless link 330. The machine system implementing the process of machine system 314 could provide feedback to user interface device 340. For example, control system 313 could monitor the state of a process implemented in machine system 314, or machine system 314 could provide the information. Control device 313 could then transfer the information related to the state of the process implemented in machine system 314 over link 322. Second transceiver 312 could then receive this information and transfer (406) the state of the process implemented in machine system 314 over wireless link 330. Second transceiver 312 could transfer this information over wireless link 330 in a similar manner as first transceiver 311 transfers communications in operation 403, or other methods could be employed.

First transceiver 311 receives (407) the information related to the state of the process implemented in machine system 314 over wireless link 330. First transceiver 311 could then transfer the information over link 321 to user interface device 340.

User interface device 340 then lights (408) indicator 342 according to the information related to the state of the process implemented in machine system 314. Examples of the state of the process implemented in machine system 314 include a start of a process, an error condition, an engagement of a mechanism, a stoppage of a machine, a speed of a process, or other states.

Figure 5:
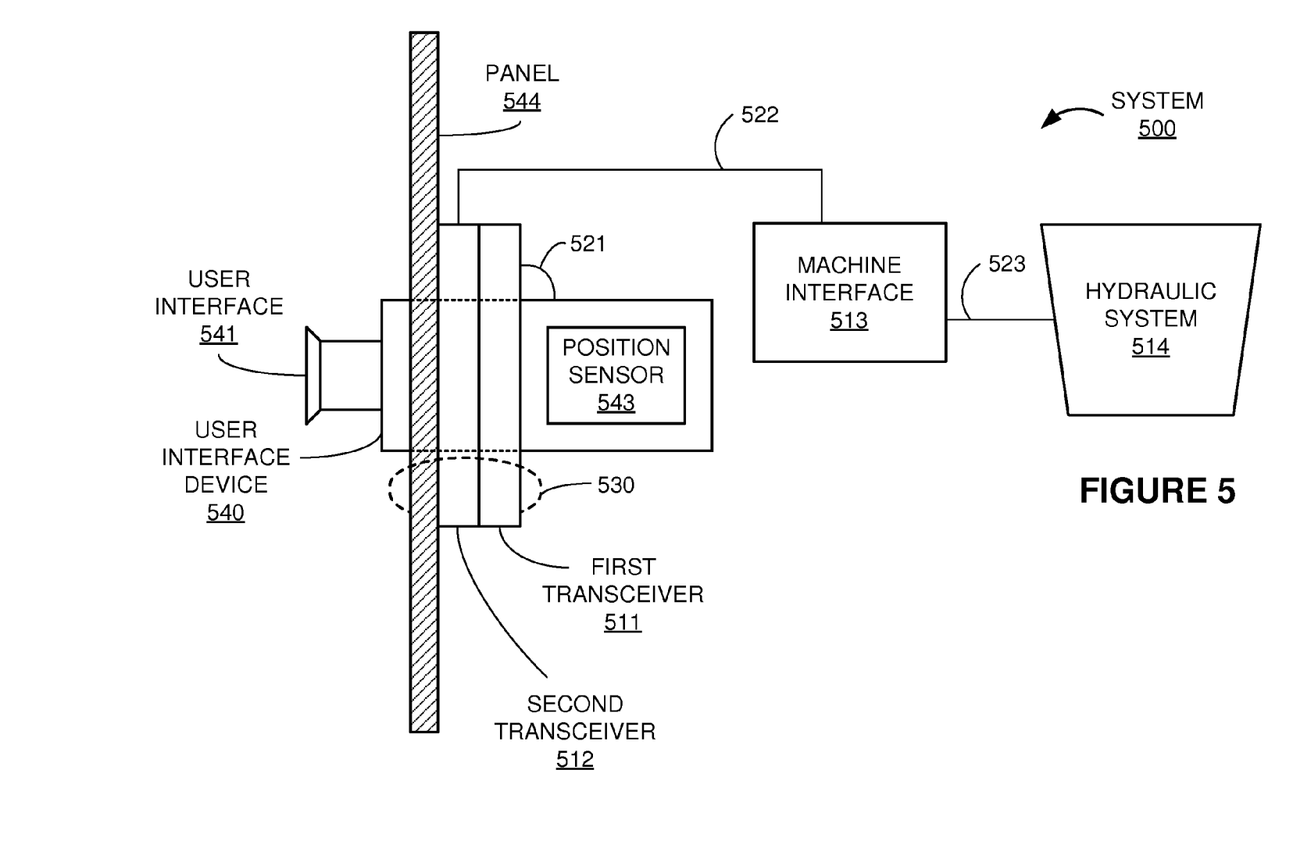
FIG. 5 is a system diagram illustrating a system for controlling a process implemented by a hydraulic system.

FIG. 5 is a system diagram illustrating system 500 for controlling a process implemented by hydraulic system 514. System 500 includes user interface device 540, first transceiver 511, second transceiver 512, panel 544, machine interface 513, and hydraulic system 514. User interface device 540 includes user interface 541 and position sensor 543.

User interface device 540 and first transceiver 511 communicate over link 521. First transceiver 511 and second transceiver 512 communicate over wireless link 530. Second transceiver 512 and machine interface 513 communicate over link 522. Machine interface 513 and hydraulic system 514 communicate over link 523.

User interface device 540 includes user interface 541, which in this example is a pushbutton. User interface device 540 also includes position sensor 543, and associated circuitry, to detect the position of the push button of user interface 541. In this example, position sensor 543 is a magnetic sensor device, where non-contact sensing occurs between a magnetic field source coupled to the push button and a generally stationary magnetic sensor to detect when the push button of user interface 541 has been pushed or released. The magnetic sensor device could include a reed switch, hall-effect sensor, or other device. In other examples, position sensor 543 includes an accelerometer, pressure sensor, or other sensor, to detect the push or release of the push button of user interface 541.

First transceiver 511 includes circuitry to induce a magnetic field in the air, space, or material environment of first transceiver 511. First transceiver 511 also includes circuitry to detect and receive magnetic fields from the air, space, or material environment of first transceiver 511. In this example, first transceiver 511 is tuned to be sensitive to near-field magnetic fields and includes an electrically conductive coil formed as a printed circuit on a printed circuit board (PCB) assembly. Also, as illustrated in FIG. 5, first transceiver 511 is coupled to user interface device 540 to form an assembly, where user interface device 540 is disposed inside of first transceiver 511 by being inserted longitudinally through a center hole of the coil of first transceiver 511, and aligned generally along the axis of first transceiver 511. User interface device 540 passes through the middle portion of the coil of first transceiver 511, so that first transceiver 511 could be mounted to surround user interface device 540.

Second transceiver 512 includes circuitry to induce a magnetic field in the air, space, or material environment of second transceiver 512. In this example, first transceiver 511 is tuned to be sensitive to near-field magnetic fields and includes an electrically conductive coil formed as a printed circuit on a printed circuit board (PCB) assembly. Also, as illustrated in FIG. 5, second transceiver 512 is coupled to panel 544 to form an assembly, where second transceiver 512 and panel 544 would have generally aligning holes cut therethrough, so as to have the holes generally aligned with the center axis of the coil of second transceiver 512.

As shown in the example in FIG. 5, the assembly formed by first transceiver 511 and user interface device 540 is removably disposed inside the assembly formed by panel 544 and second transceiver 512 by being mounted through the hole cut through the assembly formed by panel 544 and second transceiver 512.

Machine interface 513 includes equipment and circuitry to transfer power to second transceiver 512 over link 522, as well as exchange communication with second transceiver 512 over link 522. Examples of machine interface 513 include amplifiers, filters, switches, solid-state electronics, microprocessors, antennas, or other circuitry. Machine interface 513 transfers control information to hydraulic system 514 over link 523, and could receive information related to the state of the hydraulic system operation implemented by hydraulic system 514 over link 523. Machine interface 513 could communicate with further systems and equipment over communication interfaces such as DeviceLogix, radio-frequency identification (RFID), controller-area network (CAN), wireless fidelity (WiFi), infrared data association (IrDA), or other communication interfaces—including combinations, improvements, or variations thereof.

Wireless link 530 is shown in FIG. 5 as being comprised of magnetic field lines, as illustrated by the dashed line passing through first transceiver 511 and second transceiver 512. Wireless link 530 uses various communication media, such as air, space, material, or some other wireless transport media—including combinations thereof. In this example, wireless link 530 includes a magnetic field induced by the coil of first transceiver 511 in the surroundings of first transceiver 511. Second transceiver 512 could detect and receive the magnetic field energy induced by first transceiver 511. In other examples, wireless link 530 includes a magnetic field induced by a coil of second transceiver 512 in the surroundings of second transceiver 512. First transceiver 511 could detect and receive the magnetic field energy induced by second transceiver 512.

In this example, first transceiver 511 and second transceiver 512 are located in close proximity to each other to advantageously receive a larger portion of the magnetic energy induced to form wireless link 530. In this example, wireless link 530 is a near-field magnetic link. It should be understood that the magnetic field lines illustrated by the dashed lines in wireless link 530 of FIG. 5 are merely representative of wireless link 530 to show magnetic fields generated by one transceiver are able to be received at another transceiver.

Advantageously, an assembly which includes both user interface device 540 and first transceiver 511 could be made easily removable from an assembly incorporating second transceiver 512 and panel 544 to not only allow for close proximity of first transceiver 511 and second transceiver 512, but also improved ease of assembly and maintenance. Also, quick insertion and removal of the assembly incorporating user interface device 540 and first transceiver 511 from the assembly incorporating second transceiver 512 and panel 544 could be achieved without the need to connect or disconnect a wired interface.

Furthermore, panel 544 could include an array of many user interface devices, each implementing a different user interface function, along with associated transceivers, to allow for a control panel which includes controls for several processes implemented by machine systems. In examples with an array of many interface devices, system 500 could also assure the proper user interface type is inserted into the appropriate control panel location to aid in construction and repair of the control panel array assembly. Also, since a direct wire interface is not utilized between user interface device 540 and machine interface 513, reconfiguration of the varying functions of each user interface device in an array of many user interface devices could be achieved without re-wiring.

Figure 6:
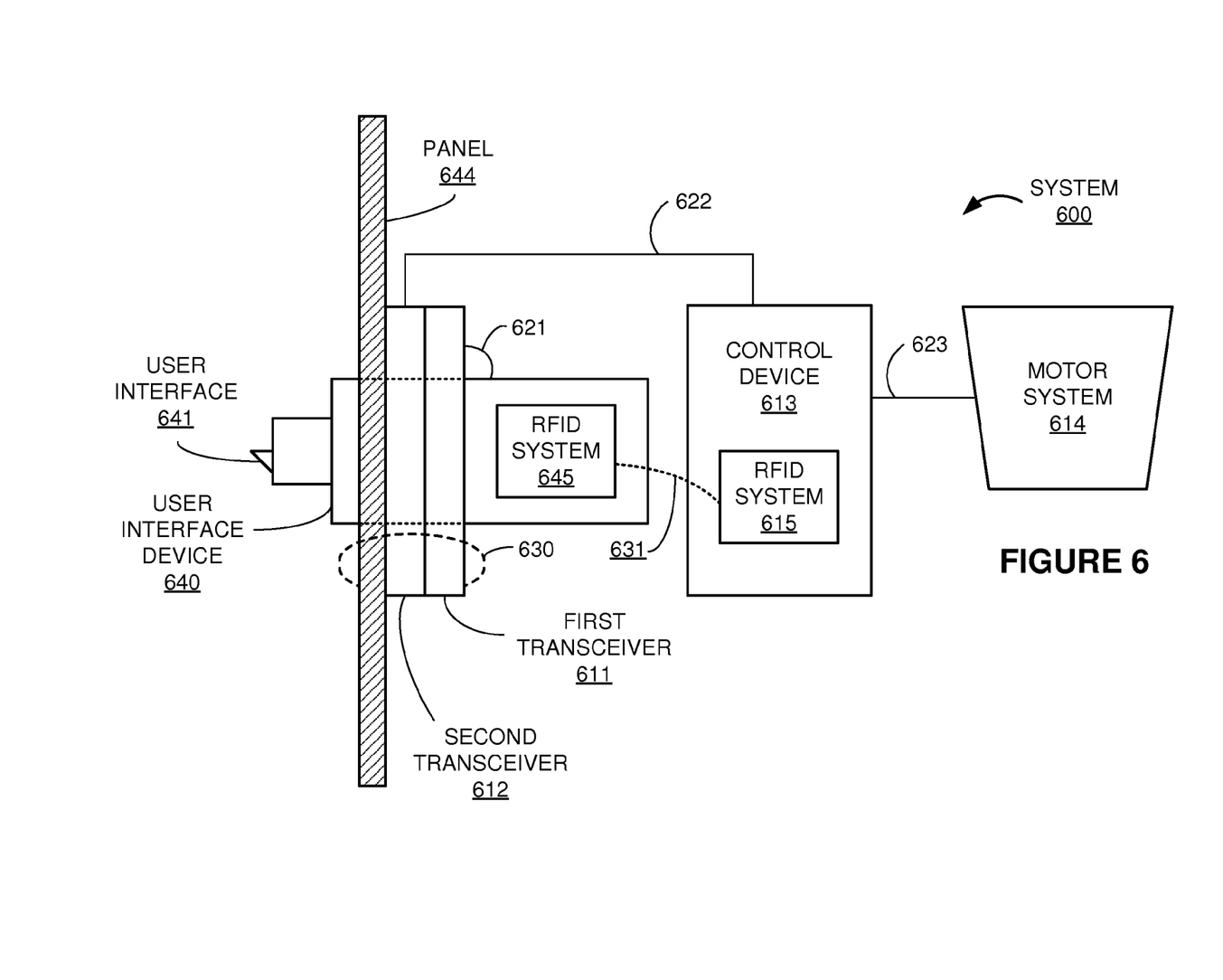
FIG. 6 is a system diagram illustrating a system for controlling a process implemented in a motor system.

FIG. 6 is a system diagram illustrating system 600 for controlling a process implemented by motor system 614. System 600 includes user interface device 640, first transceiver 611, second transceiver 612, panel 644, control device 613, and motor system 614. User interface device 640 includes user interface 641 and radio-frequency identification (RFID) system 645. Control device 613 includes RFID system 615.

User interface device 640 and first transceiver 611 communicate over link 621. First transceiver 611 and second transceiver 612 communicate over wireless link 630. Second transceiver 612 and control device 613 communicate over link 622. Machine interface 613 and motor system 614 communicate over link 623. RFID system 645 and RFID system 615 communicate over wireless link 631.

User interface device 640 includes user interface 641, which in this example is a rotary switch. User interface device 640 also includes RFID system 645, and associated circuitry, to wirelessly transfer in indicator of the position of the rotary switch of user interface 641.

First transceiver 611 includes circuitry to detect and receive magnetic fields from the air, space, or material environment of first transceiver 611. In this example, first transceiver 611 is tuned to be sensitive to near-field magnetic fields and includes an electrically conductive coil formed as a printed circuit on a printed circuit board (PCB) assembly. Also, as illustrated in FIG. 6, first transceiver 611 is coupled to user interface device 640 to form an assembly, where user interface device 640 is inserted longitudinally through the center of the coil of first transceiver 611, and aligned generally along the axis of first transceiver 611. User interface device 640 passes through the middle portion of the coil of first transceiver 611, so that first transceiver 611 could be mounted to surround user interface device 640. In some examples, at least a portion of the circuitry of user interface device 640 is formed on the PCB onto which first transceiver 611 is formed.

Second transceiver 612 includes circuitry to induce a magnetic field in the air, space, or material environment of second transceiver 612. In this example, first transceiver 611 is tuned to be sensitive to near-field magnetic fields and includes an electrically conductive coil formed as a printed circuit on a printed circuit board (PCB) assembly. Also, as illustrated in FIG. 6, second transceiver 612 is coupled to panel 644 to form an assembly, where second transceiver 612 and panel 644 would have generally aligning holes cut therethrough, so as to have the holes generally aligned with the center axis of the coil of second transceiver 612.

As shown in the example in FIG. 6, the assembly formed by first transceiver 611 and user interface device 640 is removably mounted through the hole cut through the assembly formed by panel 644 and second transceiver 612.

Control device 613 includes equipment and circuitry to transfer power to second transceiver 612 over link 622, as well as exchange communication with RFID system 645 through RFID system 615. Examples of control device 613 include amplifiers, filters, switches, solid-state electronics, microprocessors, antennas, or other circuitry. Control device 613 transfers control information to motor system 614 over link 623, and could receive information related to the state of the motor operation implemented by motor system 614 over link 623. Control device 613 could communicate with further systems and equipment over communication interfaces such as DeviceLogix, controller-area network (CAN), wireless fidelity (WiFi), infrared data association (IrDA), or other communication interfaces—including combinations, improvements, or variations thereof. In some examples, at least a portion of the circuitry of control device 613 is formed on the PCB onto which second transceiver 612 is formed.

RFID system 545 includes circuitry such as RFID tags, antennas, transceivers, identification circuitry, computer-readable storage media, or other circuitry. RFID system 545 also receives communications related to the state of user interface 641, and transfers the information over wireless link 631. In some examples, RFID system 545 is coupled to user interface device 640 and configured to receive power from first transceiver 611 and wirelessly transfer communications to control the process implemented by a machine system over wireless link 631. In other examples, RFID system 545 is coupled to second transceiver 612 and configured to receive communications to control a process implemented by a machine system from second transceiver 612 and wirelessly transfer the communications over wireless link 631.

RFID system 615 includes circuitry such as RFID readers, antennas, transceivers, or other circuitry. RFID system 615 transfers electromagnetic energy over wireless link 631 and receives communications related to the state of user interface 641 over wireless link 631. The communications could then be used to control the process implemented by a machine system, or motor system 614, in this example.

Wireless link 630 is shown in FIG. 6 as being comprised of magnetic field lines, as illustrated by the dashed line passing through first transceiver 611 and second transceiver 612. Wireless link 630 uses various communication media, such as air, space, material, or some other wireless transport media—including combinations thereof. In this example, wireless link 630 includes a magnetic field induced by a coil of second transceiver 612 in the surroundings of second transceiver 612. First transceiver 611 could detect and receive the magnetic field energy induced by second transceiver 612.

In this example, first transceiver 611 and second transceiver 612 are located in close proximity to each other to advantageously receive a larger portion of the magnetic energy induced to form wireless link 630. In this example, wireless link 630 is a near-field magnetic link. It should be understood that the magnetic field lines illustrated by the dashed lines in wireless link 630 of FIG. 6 are merely representative of wireless link 630 to show magnetic fields generated by one transceiver are able to be received at another transceiver.

Wireless link 631 is an RFID wireless link in this example. Wireless link 631 uses various communication media, such as air, space, or some other wireless transport media—including combinations thereof. Wireless link 631 is used to transfer communications to control a process implemented by a machine system from user interface device 640 to control device 613. In further examples, wireless link 631 is also used to transfer information related to a state of a process implemented by a machine system to user interface device 640 from control device 613.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless push button assembly comprising:
   a push button operable to receive user input associated with an industrial process;
   an indicator operable to display a state of the industrial process;
   a transceiver coupled to the push button and the indicator, and coupled wirelessly with one other transceiver via a near-field electromagnetic link to receive power and to exchange communications indicative of at least the state of the industrial process and the user input;
   wherein the transceiver and the one other transceiver each comprise a spiral coil;
   wherein the spiral coil of the transceiver and the spiral coil of the one other transceiver are aligned along an axis; and
   wherein the push button is mounted internally to and longitudinally along the axis of the spiral coil of the transceiver and the spiral coil of the one other transceiver.

2. The wireless push button assembly of claim 1, further comprising the one other transceiver configured to transfer power to the transceiver via the near-field electromagnetic link and to exchange the communications with the transceiver.

3. The wireless push button assembly of claim 2, wherein to exchange the communications, the transceiver transfers the communications to the one other transceiver to at least control a portion of the industrial process.

4. The wireless push button assembly of claim 1, wherein the transceiver and the one other transceiver are not coupled by a transformer core.

5. The wireless push button assembly of claim 3, wherein the industrial process includes at least one machine system associated with the push button.

6. The wireless push button assembly of claim 5, wherein the push button comprises an on/off function selectable by the user input to operate the one machine system.

7. The wireless push button assembly of claim 5, wherein the indicator comprises a light that lights based on the state of the industrial process implemented by the one machine system.

8. A wireless push button system comprising:
   a first assembly comprising:
      a push button operable to receive user input associated with an industrial process;
      an indicator operable to display a state of the industrial process; and
      a first coil;
   a second assembly comprising a second coil;
   wherein the first assembly is inserted axially into the second assembly to allow near-field power transfer over the first coil and the second coil;

wherein the first coil and the second coil each comprise a spiral coil;
wherein the spiral coil of the first coil and the spiral coil of the second coil are aligned along an axis; and
wherein the push button is mounted internally to and longitudinally along the axis.

9. The wireless push button system of claim 8, wherein the first coil forms a near-field electromagnetic link with the second coil over which to receive power and to exchange communications indicative of at least the state of the industrial process and the user input.

10. The wireless push button system of claim 8, wherein the first coil and the second coil are not coupled by a transformer core.

11. The wireless push button system of claim 8, wherein the industrial process includes at least one machine system associated with the push button.

12. The wireless push button system of claim 11, wherein the push button comprises an on/off function selectable by the user input to operate the at least one machine system.

13. The wireless push button system of claim 11, wherein the indicator comprises a light that lights based on the state of the industrial process implemented by the at least one machine system.

14. A wireless push button assembly comprising:
a user interface device operable to receive user input associated with an industrial process;
an indicator operable to display a state of the industrial process;
a transceiver coupled to the user interface device and the indicator, and coupled wirelessly with one other transceiver via a near-field electromagnetic link to receive power and to exchange communications indicative of at least the state of the industrial process and the user input;
wherein the transceiver and the one other transceiver each comprise a spiral coil;
wherein the spiral coil of the transceiver and the spiral coil the one other transceiver are aligned axially along an axis; and
wherein the user interface device is mounted internally to and longitudinally along the axis.

15. The wireless push button assembly of claim 14, wherein the user interface device comprises one of a push button, a dial, and a switch.

* * * * *